United States Patent [19]
Söderberg et al.

[11] 3,954,027
[45] May 4, 1976

[54] SEALING DEVICE FOR A CONTROL LEVER IN A VEHICLE

[75] Inventors: Tage Ernst Söderberg, Stockholm; Sten-Göran Olofsson; Nils Hilding Nilsson, both of Nykvarn, all of Sweden

[73] Assignee: Saab-Scania Aktiebolag, Sodertalje, Sweden

[22] Filed: July 5, 1974

[21] Appl. No.: 485,996

[30] Foreign Application Priority Data
July 9, 1973  Sweden .............................. 7309618

[52] U.S. Cl. ................................ 74/473 P; 74/491; 277/212 FB
[51] Int. Cl.² ........................................ B60K 20/00
[58] Field of Search .............. 74/473 R, 473 P, 491, 74/471 R; 277/212 FB

[56] References Cited
UNITED STATES PATENTS

| | | | |
|---|---|---|---|
| 3,022,678 | 2/1962 | McCordic | 74/473 |
| 3,106,851 | 10/1963 | Ivanchich | 74/473 |
| 3,264,892 | 8/1966 | Boman et al. | 74/473 |
| 3,381,987 | 5/1968 | Husen | 277/212 FB |
| 3,401,574 | 9/1968 | Doolittle | 74/473 |
| 3,850,047 | 11/1974 | Davis | 74/473 P |

*Primary Examiner*—Samuel Scott
*Assistant Examiner*—Randall Heald
*Attorney, Agent, or Firm*—Cushman, Darby & Cushman

[57] ABSTRACT

A sealing device for a control lever extending through an opening in an element. Of an opening-surrounding sealing member, which is tightly secured to the control lever, a portion is by one end of a spring pressed into contact with an opening-surrounding guide groove in the element. The other end of the spring is connected to the device to be influenced by the control lever, thus allowing relative motion between the element and said device.

10 Claims, 1 Drawing Figure

U.S. Patent May 4, 1976 3,954,027
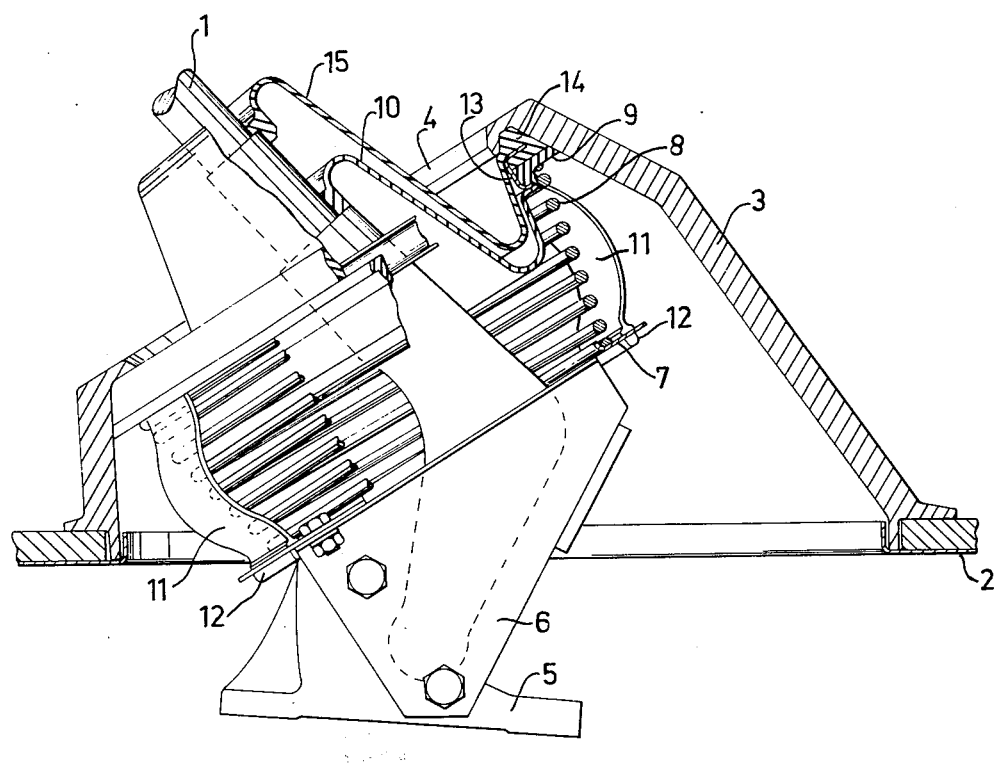

SEALING DEVICE FOR A CONTROL LEVER IN A VEHICLE

The present invention concerns a sealing device for a control lever extending through an opening in a floor or wall element in a vehicle, said sealing device comprising an openingcovering sealing member of an elastic material which sealingly encloses the control lever in a plane substantially normal to the longitudinal direction of the control lever.

When a control lever, for example a gear shift lever, extends through a floor or wall element in a vehicle body, sealing is required to prevent dirt and disturbing noise from entering the vehicle driving compartment. Such sealing normally comprises a rubber boot which is attached to the floor or wall element and which sealingly encloses the control lever. In motor vehicles in which the floor or wall element is movable in relation to the lever, for example, forward cab trucks with tilting cabs, this type of sealing is less suitable since it must be disconnected for every such tilting movement. To avoid this, use has been made of a rubber sleeve which engages the floor or wall element. The life of the rubber sleeve is, however, quite limited since the sleeve slides against the floor or wall element during every movement of the lever and during those movements arising during operating and starting between the floor or wall element and the apparatus with which the lever cooperates, for example a rubber mounted gear box unit.

The purpose of the present invention is to effect a sealing device which obviates the above-described disadvantages and which provides a satisfactory functioning independent of the mutual positions of the various parts. This is accomplished by providing the sealing device with those characteristics which appear in the subsequent claims.

The invention is more clearly described below with the aid of the attached drawing which shows a side view, partly in section, of a sealing device according to one embodiment of the invention.

In the drawing, the invention is shown as employed with a gear shift lever in a forward cab truck with a tilting cab. The gear shift lever 1 is arranged to pass through the floor 2 of the cab and a sealing device in accordance with the invention is arranged at the point of through passage which effects sealing. The floor 2 is designed with a relatively large opening which is enclosed by a conical casing 3 constructed of heat and sound insulating material. The casing tapers upward and is truncated in its upper portion and shows an upper opening substantially normal to the longitudinal direction of the gear shift lever 1. The casing is furnished with a folded edge 4 around the opening, said folded edge forming a ring-shaped, downward opening channel having trapezoidal cross-section.

The lower end of the gear shift lever 1 is connected by known means to the control means (not shown) of a gear box. The gear box and the vehicle engine are mounted to the vehicle chassis by means of rubber pads allowing the engine and the gear box to move somewhat in relation to the chassis without causing vibrations in the chassis. A bracket 5 is attached to the engine or gear box, said bracket supporting a console 6 for a support ring 7 which is substantially parallel to the casing end surface and is situated below the upper opening in the casing 3 substantially coaxial with said opening. The support ring 7 supports the narrower end of a conical coil spring 8 which encloses the gear shift lever 1 and is so dimensioned that the gear shift lever in the course of its normal movements does not engage the coil spring 8.

The second end of the spring 8 engages a ring-shaped edge rib 9 on a boot 10 which tapers outward from the casing 3 and is arranged to tightly enclose the gear shift lever 1 with its upper outer end. A plurality of straps 11 extend from the edge rib 9 of the boot 10 along the spring 8. The free ends of the straps 11 are designed with thickenings 12 and are passed through recesses in the support ring 7 so that the thickenings prevent the straps from being pulled upward. The length of the straps 11 is so dimensioned that the spring 8 in the mounted position is constantly held under a certain preload. Between the boot 10 and the edge rib 9 there is a groove in which rests the one branch of U-section retaining means 13, whose second branch rests in a groove in an edge rib 14 on a second boot 15.

The second boot 15 is arranged above the first boot 10 and, like the first boot, the boot 15 tapers conically outward from the casing 3 and sealingly encloses the gear shift lever 1 with its outer end. The edge rib 14 engages the edge rib 9 on the first boot and has a cross-section which corresponds to the shape of the ring-shaped channel in the upper portion of the casing.

The various details are so dimensioned and designed that an air-filled space is formed between the boots 10 and 15. The advantage therewith is good insulation against both heat and disturbing noise and against possible exhaust gases or other gases from the engine.

With the cab in a normal position, the sealing means are situated in the positions in accordance with what is shown in the drawing. The spring 8 is there compressed a certain amount so that the straps 11 are slack. The spring 8 then presses the edge ribs 9 and 14 into sealing engagement against the ring-shaped channel in the upper portion of the casing 3. Because of the mobility of the spring, this position can be maintained regardless of the movements of the gear box and engine in relation to the body and regardless of the differences in positions which can arise because of production tolerances or similar causes.

When the cab is tilted upward, the floor 2 and the casing 3 move upward. The spring 8 is extended then to the position which the length of the straps 11 allows. This position is then maintained. As the cab is tilted down, the inner conical portion of the casing 3 provides a good guidance for the edge ribs 9 and 14 to the ring-shaped channel in the casing 3, whereby possible faults in the mutual positions of the parts can be compensated. The device according to the invention ensures that by said guidance of the parts to the right position satisfactory sealing around the control lever is always effected.

The invention is, of course, not limited to the above embodiment. Changes and modifications can be carried out within the scope of the claims which follow. For example, coil spring 8 can be cylindrical so that the straps 11 preferably are situated on the inside of coil spring 8. The straps 11 can also be replaced by a jacket within or outside of the coil spring 8, depending on the shape of the coil spring.

What we claim is:

1. A sealing device for a control lever extending through an opening in a floor or wall element in a vehicle, said sealing device comprising an opening-covering sealing member of an elastic material which sealingly encloses the control lever in a plane substantially normal to the longitudinal direction of the control lever, characterized in that the sealing member is arranged to be pressed by one end of a coil spring into engagement with an opening-surrounding guide groove in the floor or wall element or in means which are rigidly connected thereto, the second end of said coil spring engaging a support rigidly connected to the device the control lever is intended to influence, said coil spring surrounding the control lever and having so large a diameter so as to permit normal movement of the control lever without the control lever coming into contact with the spring, said coil spring also being designed to provide a constant contact pressure in the guide groove independent of the length alterations the spring is subjected to under operation and to prevent transmission of motion between said support and the floor or wall element by permitting lateral movements.

2. A sealing device according to claim 1 applied to a control lever extending through an opening in a floor or wall element which is movable substantially in the longitudinal direction of the control lever, characterized in that between the sealing member and the support is affixed at least one connecting means which by a predetermined length determines the maximal extension of the spring during relative movement between the floor or wall element and the device the control lever is intended to influence.

3. A sealing device according to claim 2, characterized in that the connecting means comprise flexible straps having limited length, each strap at one end being rigidly connected to the outer edge of the sealing member, said edge engaging the opening-surrounding guide groove, and the other end of each strap being affixed to said support.

4. A sealing device according to claim 1, characterized in that the sealing member is adapted to be pressed with conical guidance into engagement with the guide groove which is designed as a ringshaped channel with trapezoidal cross-section.

5. A sealing device according to claim 1, characterized in that a member rigidly connected to the floor or wall element is designed as a conical casing which encloses the opening in the floor or wall element at its larger end and is fitted with said guide groove at its smaller end.

6. A sealing device according to claim 5, characterized in that the conical casing constitutes a guiding part for the sealing member for movements between the floor or wall element and the control lever.

7. A sealing device according to claim 1, characterized in that the sealing member comprises at least one boot which on a major portion of its length tapers conically outward from the floor or wall element.

8. A sealing device according to claim 1 characterized in that the sealing member comprises two substantially conical boots each of which on a major portion of its length tapers outward from the floor or wall element, said boots defining an air-filled interspace.

9. A sealing device according to claim 8, characterized in that the narrower ends of the boots at a distance from each other sealingly enclose the control lever, the wider ends of said boots being held together by means of a U-section retaining means, the branches of which engage grooves in the outer edges of the boots.

10. A sealing device according to claim 1, characterized in that the support, which is rigidly connected to the device the control lever is intended to influence, is designed as a support ring with flane guidance for the coil spring.

* * * * *